United States Patent [19]

Kelly et al.

[11] Patent Number: 4,705,585

[45] Date of Patent: Nov. 10, 1987

[54] PRODUCTION OF GLASS OR GLASS-CERAMIC TO METAL SEALS WITH THE APPLICATION OF PRESSURE

[75] Inventors: Michael D. Kelly, West Alexandria; Daniel P. Kramer, Dayton, both of Ohio

[73] Assignee: The United States of America as represented by the United States Department of Energy, Washington, D.C.

[21] Appl. No.: 688,671

[22] Filed: Jan. 4, 1985

[51] Int. Cl.⁴ ............................................. B32B 31/20
[52] U.S. Cl. ......................................... 156/89; 65/36; 65/59.1
[58] Field of Search ................. 156/89; 65/36, 42, 43, 65/45, 49, 50, 51, 59.1, 59.24, 59.25; 419/49

[56] References Cited

U.S. PATENT DOCUMENTS

| | | | |
|---|---|---|---|
| 2,219,573 | 10/1940 | Fraenckel | 65/42 |
| 2,392,314 | 1/1946 | Dalton | 65/42 |
| 2,876,596 | 3/1959 | Kessler | 65/42 |
| 2,878,140 | 3/1959 | Barr | 419/49 |
| 3,220,815 | 11/1965 | McMillan et al. | 65/32 |
| 4,032,337 | 6/1977 | Boyer | 419/49 |
| 4,159,075 | 6/1979 | Ljung et al. | 228/116 |
| 4,485,961 | 12/1984 | Erbom et al. | 419/49 |
| 4,492,737 | 1/1985 | Conolly | 419/49 |

OTHER PUBLICATIONS

"Sealing Glass–Ceramics to Metals, Part I", McMillan et al, Glass Technology, vol. 7, No. 4, pp. 121–127, Aug. 1966.

"List Isostatic Pressing", Clauer et al, MCIC-82-46, Sep. 1982.

*Primary Examiner*—Caleb Weston
*Attorney, Agent, or Firm*—Armand McMillan; Judson R. Hightower

[57] ABSTRACT

In a process for preparing a glass or glass-ceramic to metal seal comprising contacting the glass with the metal and heat-treating the glass and metal under conditions whereby the glass to metal seal is effected and, optionally, the glass is converted to a glass-ceramic, an improvement comprises carrying out the heat-treating step using hot isostatic pressing.

7 Claims, No Drawings

PRODUCTION OF GLASS OR GLASS-CERAMIC TO METAL SEALS WITH THE APPLICATION OF PRESSURE

The U.S. Government has rights in this invention pursuant to Contract No. DE-AC04-76DP00053 between the U.S. Department of Energy and Monsanto Research Corporation.

BACKGROUND OF THE INVENTION

This invention relates to a significant improvement in glass or glass-ceramic to metal seals and processes for their formulation.

Glass or glass-ceramic to metal seals are generally fabricated in a two-step process. Firstly, the glass component and the metal component are preliminarily bonded to one another using molten glass followed by cooling or a glass preform followed by heat or RF energy. Thereafter, the initially formed preliminary seal is subjected to a time-temperature "seal cycle" during which the final seal is made. In addition, as is well known, in appropriate systems, the glass to metal seal is transformed into a glass-ceramic to metal seal comprising various crystalline forms (quartz, cristobalite, etc.), the precise form of the crystallized phases depending on the composition and conditions employed. This time/temperature cycle is carried out under ambient pressure. See, e.g., McMillan et al, *Glass Technology*, Vol. 7, No. 4, Aug., 1966, pp. 121–127, whose entire disclosure is incorporated by reference herein. Alternatively, the foregoing process can be carried out in a single time/temperature cycle.

The quality of the finished seal is dependent on a multitude of factors and it is normally characterized in terms of burst strength, hermeticity, porosity, and the extent of the reaction between the glass ceramic and the metal component as a result of the processing wherein the glass or glass-ceramic finally flows onto and seals with the metal component parts.

Many disclosures describe the general method outlined above and also other related methods. See, e.g., U.S. Pat. No. 2,876,596 which uses a hot press to apply pressure (up to 7,000 psi) while heating to a temperature just above the strain point of the glass but well below the melting point of the glass; U.S. Pat. No. 4,159,075 which also uses similarly low pressures (e.g., up to 100 $N/cm^2$) to seal glass to a metal or other bonding material without melting of the glass; McMillan, supra, which mentions the use of pressure to regulate the flow of the glass during the first melting step; U.S. Pat. No. 3,220,815 which discusses the pre-treatment of metal substrates prior to the sealing operation; U.S. Pat. No. 2,219,573 which also employs classical unidirectional pressure to increase the flow of glass during the metal contacting first step; and U.S. Pat No. 2,392,314 which relates to various preferred glass compositions for use in the prior art process.

The quality achievable using state-of-the-art techniques is still inadequate for many purposes, especially the more demanding ones.

SUMMARY OF THE INVENTION

Accordingly, it is an object of this invention to provide an improvement in the method for preparing glass and/or glass-ceramic to metal seals and to provide the resultant improved seals themselves.

Upon further study of the specification and appended claims, further objects and advantages of this invention will become apparent to those skilled in the art.

These objects have been obtained by providing, in a process for preparing a glass or glass-ceramic to metal seal comprising contacting the glass with the metal and (simultaneously or subsequently) heat-treating the glass and metal under conditions whereby the seal is effected and, optionally, the glass is ceramized, the improvement comprising carrying out the seal-effecting, heat-treating step under pressure, e.g., using hot isostatic pressing, effective to improve the quality of the seal, e.g., as discussed below, and to effect ceramization where applicable.

They have also been obtained by providing the glass or glass-ceramic to metal seals prepared by the process of this invention.

DETAILED DISCUSSION

The hot isostatic pressing (HIP) step of this invention per se is carried out using fully conventional apparatus and techniques, under conditions which are routinely determinable in accordance with this disclosure in conjunction with conventional considerations relating to the attainment of desired glass properties and to the use of HIP. For example, suitable HIP apparatus and techniques are disclosed in "Hot Isostatic Processing", MCIC-82-46 (Metals and Ceramics Information Center, Columbus, Ohio), Clauer et al (1982), whose entire disclosure is incorporated by reference herein. No special considerations are needed to apply this known technology to this invention. Furthermore, it is also possible to use instead of HIP other methods which produce conditions which are equivalent to those described herein. However, HIP is preferred.

This invention is based on the finding that imposition of pressure during the step of finalizing glass or glass-ceramic to metal seals provides seals which have superior properties to those heretofore achievable. This extra degree of freedom provided by pressure also enables additional convenience and ease in optimizing the desired properties of the resultant seal.

This invention can be carried out in conjunction with either the multi step or single step conventional procedures described above. For instance, the HIP can be applied after the initial combination of glass and metal are made conventionally. Alternatively, the initial contacting of glass and metal and the finalization of the seal can all be conducted simultaneously as in the prior art except under the influence of the pressure as required herein. In general, the conditions for carrying out all of the steps of this invention will be fully conventional per se or at least fully conventionally determinable based on conventional considerations in conjunction with this disclosure except for the imposition of the pressure required by this invention.

Typically, the temperature/time cycle required by this invention will involve a first (optional) preliminary seal formation stage carried out at about 50–100 centigrade degrees above the melting point of the glass of interest. The duration at this temperature treatment is typically from about 5 minutes to about 1 hour, generally around 15 minutes or so. This preliminary heating step can also be carried out under the pressure of this invention in order to facilitate the flowing of the glass onto the metal to make intimate contact therewith.

The next stage, where ceramization is involved, is the melting of the glass to a temperature suitable for the formation of small nucleating crystallites, as is conventional. Suitable temperatures are typically 250-350 centigrade degrees below the melting temperature, e.g., often 600-700° C, and treatment times are about 5 minutes to about 2-3 hours, again typically around 15 minutes or so. The final stage involves the conventional growth phase wherein the glass is held at a temperature about 100-300 centigrade degrees above the nucleation temperature in order to facilitate growth of the crystal phases effecting the ceramization and also to effect the final seal. Typically, this stage is carried out at about 700-1000° C. The application of the pressure of this invention must be made at least in this last stage of the seal formation process.

In general, the hot isostatic processing is carried out at a pressure of 10,000-60,000 psi, preferably 15,000-30,000 psi. Particular pressure values appropriate for a given glass or glass-ceramic to metal system will be readily routinely selected, perhaps with a few preliminary orientation experiments, in order to ensure that high seal properties are attained, yet good ceramization is effected as can be determined fully conventionally. Generally, the higher the pressure (e.g., 30,000-60,000 psi), the higher the seal quality as measured by conventional parameters, e.g. the lower the bubble retention. The lower the pressure (e.g., around 15,000 psi), the better the ceramization. Consequently, in carrying out this invention for glass-ceramic to metal systems, an intermediate pressure value will be routinely selected to provide satisfactory high sealing and ceramizing effects at the same time. The precise optimum value range will, of course, be system specific and typically will be the lowest pressure at which good sealing properties are attained.

This invention is applicable to the glass or glassceramic to metal seal field in general. All starting material glasses heretofore used in these fields are fully applicable. It is also applicable to the metals generally used in this field, including, e.g., Inconel 718 and 625, Hastelloy C-276 and stainless steel (e.g., 21-6-9). See the references cited above and other well known works in the field, e.g., McMillan, *Glass Ceramics,* 1979 (Academic Press), which disclosure is incorporated by reference herein. Significantly, it is especially applicable to systems which resulted in inferior seals using prior art processes. Such seals will often be improved by the invention to the extent that they will be useful for many purposes for the first time.

This application is especially applicable to the formation of glass-ceramic to metal seals, i.e., to systems wherein the initially formed glass to metal seal is converted to a glass-ceramic to metal seal under the application of appropriate time/temperature conditions. Glasses which undergo this transition are well known and discussed, e.g., in the references cited above. Typical such glasses are in the lithia-alumina-silicate family. However, this invention is also applicable to the many glasses which do not ceramize under conditions utilized in conjunction with this invention. Such glasses are equally well known. Typical families are the soda-lime-silicate glasses. For either application, the process of this invention can be carried out, if desired, in a single temperature/time cycle under the inventive pressure application of this invention. For each particular system of interest, precise optimum conditions can be readily determined in accordance with this disclosure. The details of the process of this invention, other than as described herein, are conventional, e.g., as described in many state-of-the-art references, e.g., McMillan et al supra, etc.

It has been found that the process of this invention enables the preparation of glass or glass-ceramic to metal seals having properties heretofore unachievable. This is due to the beneficial effects of the pressure applied. It is believed this causes the glass seal to crystallize to a more beneficial extent than heretofore possible in glass-ceramic applications. It is also believed that it represses gasforming reactions (thermodynamically), and consequently eliminates or significantly reduces the formation of bubbles often found at the glass-metal interface. This invention provides a new flexibility in the preparation of glass or glass-ceramic to metal seals in that it adds pressure to the variables of composition, temperature and time to effectively control the ceramization and/or sealing of glass in glass or glass-ceramic to metal seals.

HIP has never before been suggested for a use such as that of this invention. Heretofore, it was used to consolidate powders (including glass powders which were already ceramized) and to heal defects in metal and alloy castings. See, e.g., MCIC-82-46 supra, wherein the use of metal or glass cans is reported for containing preform powders which undergo HIP. However, this is entirely different from the use of HIP of this invention for purposes of ceramization.

It is found that utilizing pressure in the process of this invention results in a significant improvement in the burst strength, hermeticity, porosity and the extent of reaction between the glass component and the metal component. The microstructures of the glass-ceramic to metal interface of this invention have been observed to be almost pore-free, to a large extent accounting for the improvements in the seal properties. Typically, burst strengths are at least two times higher than state-of-the-art values and hermeticity values are 100% as defined below.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES

In order to demonstrate the superiority of this invention, glass-ceramic to metal seals were fabricated using state-of-the-art technology. The same process was repeated identically except that the pressure required by this invention was imposed. The time/temperature cycle utilized for all of the seals reported below was as follows: 15 minutes at a molten glass temperature of 1010° C, followed by 15 minutes at a nucleation temperature of 600-640° C., and followed by a growth stage treatment of 20 minutes at 810° C. In the HIP process of this invention, the imposed pressure was 30,000 psi. The heating and cooling rates were the same throughout.

TABLE 1

| HERMETICITY* OF THE GLASS-CERAMIC TO METAL SEAL | | |
| --- | --- | --- |
| | Prior Art Process (%) | HIP Process (%) |
| Inconel 625 | 16 | 100 |
| Inconel 718 | 16 | 100 |
| Hastelloy C-276 | 0 | 100 |
| 21-6-9 SS | 33 | 100 |

*Number of seals exhibiting helium leak rates of less than $10^{-8}$ std cm$^3$/sec.

TABLE 2

| HYDROSTATIC BURST STRENGTH* | | |
| --- | --- | --- |
| | Prior Art Process (psi) | HIP Process (psi) |
| Inconel 625 | 1933 | 2793 |
| Inconel 718 | 2659 | 5382 |
| Hastelloy C-276 | 1820 | 5429 |
| 21-6-9 SS | 3179 | 6800 |

*Each value is the average for five samples tested using one particular heat cycle.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for preparing a glass or glass-ceramic to metal seal comprising contacting the glass with the metal and heat-treating the glass and metal under conditions whereby the glass to metal seal is effected and, optionally, the glass is converted to a glass-ceramic, the improvement comprising carrying out the heat-treating step under hot isostatic pressing and using molten glass.

2. A process of claim 1 wherein the hot isostatic pressing is carried out at a pressure of 15,000-30,000 psi.

3. A process of claim 1 wherein the hot isostatic pressing is carried out at a pressure of 10,000-60,000 psi.

4. A process of claim 3 comprising heating the glass and metal to a temperature at which the glass melts and for a period of time under which the seal is effected, and wherein the glass is not ceramized.

5. A process of claim 3 wherein the glass is one which forms a glass-ceramic under effective temperature conditions, and comprising heating the glass at a temperature under which the glass melts for a time sufficient for the glass to flow onto the metal and form a bond therewith, heating the glass-metal combination at a temperature and for a period of time effective to create crystallization nuclei in the glass, and then heating the glass at a temperature and for a period of time effective to cause growth of said nuclei into crystals effective to ceramize the glass.

6. A process of claim 5 wherein the first temperature/time stage is about 50-100 centigrade degrees above the melting point of the glass for about 5 minutes to about 1 hour, the second temperature/time stage is about 250-350 centigrade degrees below the melting temperature for about 5 minutes to about 2 hours, and the third temperature/ time stage is about 100-300 centigrade degrees above said second temperature for about 5 minutes to about 2 hours.

7. A process of claim 5 wherein the metal compound is a nickel alloy.

* * * * *